(12) United States Patent
Despesse et al.

(10) Patent No.: US 11,431,264 B2
(45) Date of Patent: Aug. 30, 2022

(54) ELECTRICAL CONVERTER

(71) Applicant: Commissariat a l'Energie Atomique et aux Energies Alternatives, Paris (FR)

(72) Inventors: Ghislain Despesse, Grenoble (FR); Xavier Maynard, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 1 day.

(21) Appl. No.: 17/124,036

(22) Filed: Dec. 16, 2020

(65) Prior Publication Data

US 2021/0194386 A1    Jun. 24, 2021

(30) Foreign Application Priority Data

Dec. 18, 2019   (FR) ...................................... 19 14775

(51) Int. Cl.
*H02M 7/797*   (2006.01)
*H02M 11/00*   (2006.01)

(52) U.S. Cl.
CPC ........... *H02M 7/797* (2013.01); *H02M 11/00* (2013.01)

(58) Field of Classification Search
CPC ......... H02M 11/00; H02M 7/797; H02M 7/81
See application file for complete search history.

(56) References Cited

U.S. PATENT DOCUMENTS

| | | | |
|---|---|---|---|
| 2003/0016111 A1* | 1/2003 | Zverev | H01L 41/107 336/182 |
| 2006/0220495 A1* | 10/2006 | Yamaguchi | H02M 3/28 310/318 |
| 2017/0085189 A1 | 3/2017 | Madsen | |
| 2017/0287633 A1 | 10/2017 | Rivas Davila et al. | |
| 2018/0287503 A1 | 10/2018 | Despesse et al. | |
| 2019/0020269 A1* | 1/2019 | Ekhtiari | H02M 3/33592 |

FOREIGN PATENT DOCUMENTS

FR   2 020 121 A1   7/1970

OTHER PUBLICATIONS

French Preliminary Search Report dated Aug. 18, 2020 in French Application 19 14775 filed on Dec. 18, 2019 (with English Translation of Categories of Cited Documents & Written Opinion), 11 pages.

(Continued)

*Primary Examiner* — Nguyen Tran
(74) *Attorney, Agent, or Firm* — Oblon, McClelland, Maier & Neustadt, L.L.P.

(57) ABSTRACT

An electrical converter chosen from the group consisting of an inverter able to generate an AC voltage from a DC voltage and a rectifier able to generate a DC voltage from an AC voltage. This converter comprises a first inductor and a controllable switch that are connected in series between first and second DC voltage ports. The converter comprises a piezoelectric resonator comprising:
a first electrode connected directly to a first power terminal of the switch,
a second electrode connected directly to a second power terminal of the switch, and
a piezoelectric material interposed between the first and second electrodes.

11 Claims, 4 Drawing Sheets

(56) References Cited

OTHER PUBLICATIONS

Rivas et al., "A High-Frequency Resonant Inverter Topology With Low-Voltage Stress", IEEE Transactions on Power Electronics, vol. 23, No. 4, Jul. 2008, 14 pages.
Gu et al., "High-Frequency Resonant Converter with Synchronous Rectification for High Conversion Ratio and Variable Load Operation", 2018 International Power Electronics Conference, May 20, 2018, pp. 632-638.
Glaser et al., "A 500 W Push-pull Dc-dc Power Converter with a 30 MHz Switching Frequency", Applied Power Electronics Conference and Exposition (APEC), Feb. 21, 2010, pp. 654-661.
Madsen, et al., "Very High Frequency Switch-Mode Power Supplies.: Miniaturization of Power Electronics", Technical University of Denmark, Department of Electrical Engineering, May 2015, 489 pages.
Vijayasarathi, et al., "Simulation and Performance Analysis of Parallel Resonant Inverter for Electronic Ballast Application", International Journal of Advanced Research in Electrical, Electronics and Instrumentation Engineering, vol. 4, issue 2, Feb. 2015, 6 pages.

* cited by examiner

ELECTRICAL CONVERTER

The invention relates to an electrical converter chosen from the group consisting of an inverter able to generate an AC voltage from a DC voltage and a rectifier able to generate a DC voltage from an AC voltage.

Many electrical converters are known. In particular, one particularly advantageous known converter is the inverter known under the term class $\phi_2$ or $EF_2$ inverter.

The invention aims to propose an electrical converter that has the same advantages as a class $\phi_2$ inverter while at the same time having improved efficiency or a smaller footprint.

It therefore relates to such an electrical converter.

The invention will be better understood on reading the following description, which is given solely by way of non-limiting example, and with reference to the drawings, in which.

In the remainder of this description, features and functions that are well known to a person skilled in the art are not described in detail.

In this description, detailed exemplary embodiments are first described in section I with reference to the figures. Then, in a following section II, variants of these embodiments are presented. Lastly, the advantages of the various embodiments are presented in section III.

Section I: Exemplary Embodiments

Figure 1:
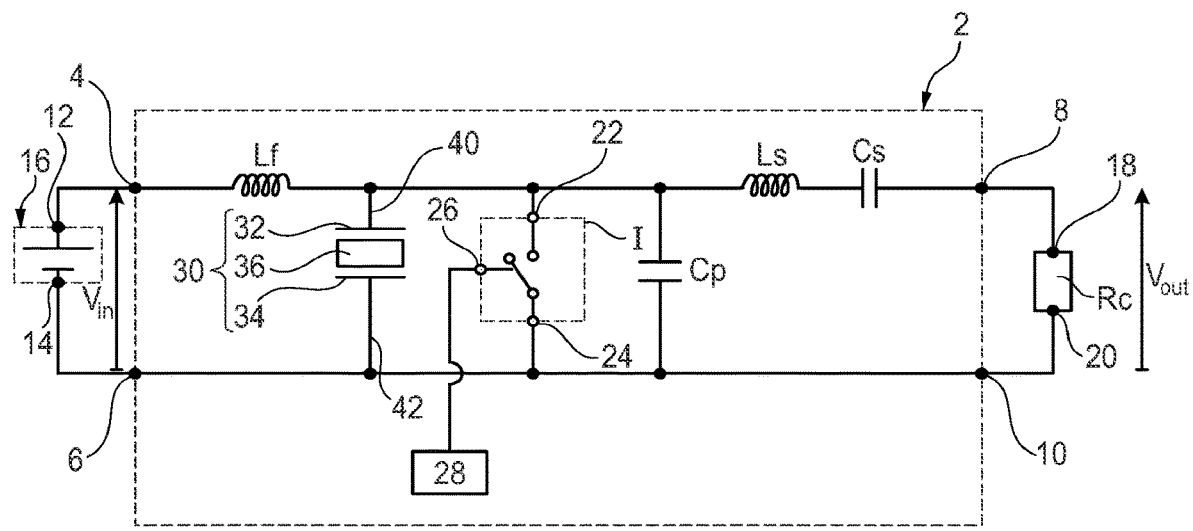
FIG. 1 is a circuit diagram of an electrical converter.

FIG. 1 shows a reversible inverter 2 comprising two input ports 4 and 6 and two output ports 8 and 10.

A reversible inverter is a particular electrical converter that is equally capable of operating as an inverter and as a rectifier. In fact, to change operating mode, it is enough to swap the positions of the load and of the power source. Specifically, the reversible inverter 2 operates as an inverter when a DC power source is connected between its input ports 4 and 6 and a load is connected between its output ports 8 and 10. Conversely, the reversible inverter 2 operates as a rectifier when a load is connected between its input ports 4 and 6 and an AC power source is connected between its output ports 8 and 10.

Hereinafter, the description is given in the specific case in which the reversible inverter 2 is used as an inverter. However, as noted above, it may easily be used as a rectifier by simply swapping the position of the load and of the power source.

The ports 4 and 6 are electrically connected directly to the terminals 12 and 14 of a DC voltage $V_{in}$ source 16.

Hereinafter, unless indicated otherwise, the term "connect" denotes an electrical connection between two components, typically via an electrical track or wire. When it is specified that a first and a second component are connected "directly" to one another, this means that they are connected to one another without passing via another electrical component of the inverter. In other words, they are connected to one another using only an electrical track or wire that extends from an electrical terminal of the first component to an electrical terminal of the second component.

The voltage $V_{in}$ may be arbitrary. However, it is conventionally greater than 1 Vdc or 5 Vdc and may, for certain applications, exceed 50 Vdc or 100 Vdc. Conversely, the voltage $V_{in}$ is generally less than 10,000 Vdc or 1000 Vdc.

The ports 8 and 10 are the ports between which an AC voltage $V_{out}$, generated from the voltage $V_{in}$ by the inverter 2, is delivered. The voltage $V_{out}$ is an AC voltage whose fundamental frequency is equal to a frequency $f_s$. Thus, in the power spectrum of the voltage $V_{out}$, the majority of the electric power of the voltage $V_{out}$ is at the frequency $f_s$. The frequency $f_s$ is typically here between 1 MHz and 300 MHz.

The ports 8 and 10 are connected directly, respectively, to the terminals 18 and 20 of a resistive load Rc. The load Rc may be a simple resistor in the simplest case. It may also be a matching circuit that has the two terminals 18 and 20 as well as two output terminals. The output terminals are themselves connected to an auxiliary electrical load that is not solely resistive. For example, the auxiliary load may be an inductive load or a capacitive load or a mixture of the two. The matching circuit is configured such that the impedance between the terminals 18 and 20 is purely resistive at the frequency $f_s$. Such a matching circuit is known, and is therefore not described in more detail here. In many cases, it is possible to place a rectifier assembly between the ports 8 and 10 in order to supply a DC voltage whose value will be different from the input DC voltage $V_{in}$. However, the impedance seen between the ports 8 and 10 will remain substantially resistive at the frequency $f_s$, specifically by virtue of the possible addition of a matching circuit.

The inverter 2 comprises an inductor Lf and a switch I that are connected in series between the ports 4 and 6. The inductor Lf here is connected directly, on one side, to the port 4 and, on the opposite side, to the switch I.

In this description, "connected, on one side, to a first element and, on the opposite side, to a second element" denotes the fact that a first electrical connection pin and a second electrical connection pin of the component are connected, respectively, to the first and second elements. In the case of an inductor, these first and second pins are the two opposing ends of the coil that forms this inductor. In the case of a capacitor, the first and second pins are those connected directly to the two electrodes of the capacitor.

The switch I is a controllable switch comprising two power terminals 22 and 24 and a control terminal 26. The terminal 22 here is connected directly to the inductor Lf. The terminal 24 is connected directly to the port 6. The control terminal 26 is connected to a circuit 28 for driving the switch I.

The switch I is able to switch, reversibly and in response to a control signal received on its terminal 26, between a closed state and an open state. In the closed state, the terminals 22 and 24 are electrically connected to one another. In this closed state, the lowest electrical resistance between the terminals 22 and 24 is known by the term resistance $R_{on}$. In the open state, the terminals 22 and 24 are electrically isolated from each other, that is to say that the electrical resistance between the terminals 22 and 24 is one hundred or one thousand times greater than the resistance $R_{on}$. For example, in the open state, the resistance between the terminals 22 and 24 is greater than 1 MΩ or 10 MΩ.

The switch I is able to switch at the frequency $f_s$. For example, the switch I is a field-effect transistor such as an insulated-gate field-effect transistor, known by the acronym MOSFET ("Metal-Oxide Semiconductor Field-Effect Transistor"). More precisely, in this exemplary embodiment, the switch I is a MOSFET whose drain corresponds to the terminal 22 and whose source corresponds to the terminal 24. The terminal 26 corresponds to the gate of this transistor.

The circuit 28 controls the switching of the switch between its open and closed states. More precisely, the circuit 28 is configured such that, over an operating period $T_s$, the switch I is continuously in the closed state for a first time interval, and then continuously in the open state for a second time interval. The durations of the first and second intervals are equal, respectively, to $\alpha T_s$ and $(1-\alpha)T_s$, where:
$T_s$ is the duration of the period, and therefore equal to $1/f_s$, and
$\alpha$ is a ratio between 0 and 1, known by the term "duty cycle".

The ratio $\alpha$ is generally chosen between 0.2 and 0.5 or between 0.25 and 0.4.

To this end, the circuit 28 may comprise its own oscillator or be connected to the terminal 22 in order to automatically trigger the switching of the switch I when the voltage present on the terminal 22 crosses a predetermined threshold.

The inverter 2 comprises an inductor Ls and a capacitor Cs that are connected in series with the switch I between the output ports 8 and 10. The inductor Ls and the capacitor Cs are connected here in series between the port 8 and the terminal 22 of the switch I. More precisely, in this exemplary embodiment, the capacitor Cs is, on one side, connected directly to the port 8 and, on the opposite side, connected directly to the inductor Ls. The inductor Ls is also connected directly to the terminal 22.

In this embodiment, a capacitor Cp is connected directly between the terminals 22 and 24. It is therefore placed in parallel with the switch I. Thus, on one side, the capacitor Cp is connected directly to the inductor Ls and, on the opposite side, the capacitor Cp is connected directly to the port 10.

The inductor Ls and the capacitors Cs and Cp are also connected directly in series with one another between the ports 8 and 10.

Finally, the inverter 2 comprises a piezoelectric resonator 30. This resonator 30 comprises:
a first conductive electrode 32,
a second conductive electrode 34, and
a piezoelectric material 36 interposed between the electrodes 32 and 34.

This resonator 30 has a resonant frequency $f_{RP}$ between 1.5 $f_s$ and 2.5 $f_s$ and, preferably, between 1.9 $f_s$ and 2.1 $f_s$. The frequency $f_{RP}$ is equal to 2 $f_s$ here. Therefore, the resonator 30 is able to oscillate continuously at the frequency 2 $f_s$ when it is excited by the voltage present between the terminals 22 and 24.

The piezoelectric material 36 has at least a high electromechanical coupling coefficient, that is to say greater than 5% or 10%. For example, the material 36 is chosen from the group consisting of quartz, $BaTiO_3$, LZT (lead zirconate titanate), AlN (aluminum nitride) and $NiNbO_3$.

The electrodes 32 and 34 of the resonator 30 are connected directly here, respectively, to the inductor Lf and to the port 6 via electrical connections 40 and 42, respectively.

The resonator 30 eliminates even-order harmonics in the voltage $V_I$ between the terminals 22 and 24, such that the voltage stress across the terminals of the switch I is reduced. Voltage stress is also known under the term "switching voltage stress". For example, typically, the voltage stress across the terminals of the switch I here is less than $2.5V_{in}$ or $2V_{in}$ and preferably less than $1.7V_{in}$ or $1.5V_{in}$. Since the voltage stress is reduced, for equal efficiency with a class $\phi_2$ inverter, the technical constraints on the choice of the switch are relaxed. This relaxation on the technical constraints is taken advantage of here:

in order to choose, with equal efficiency, a switch I smaller than the one present in a class $\phi_2$ inverter, and/or
in order to choose a switch whose resistance $R_{on}$ is lower, and therefore in order to increase the efficiency of the inverter 2 in comparison with a class $\phi_2$ inverter with the same footprint.

The efficiency of an inverter here is the ratio $P_{out}/P_{in}$ expressed as a percentage, where:
$P_{out}$ is the electric power delivered to the load Rc, and
$P_{in}$ is the electric power delivered by the source 16.

Here, unless indicated otherwise, the various electrical connections between the various components of the inverter 2 are for example electrical tracks of a printed circuit board. These various components of the inverter 2 are therefore soldered onto these electrical tracks or formed by etching a metallization layer of the printed circuit board.

Figure 2:
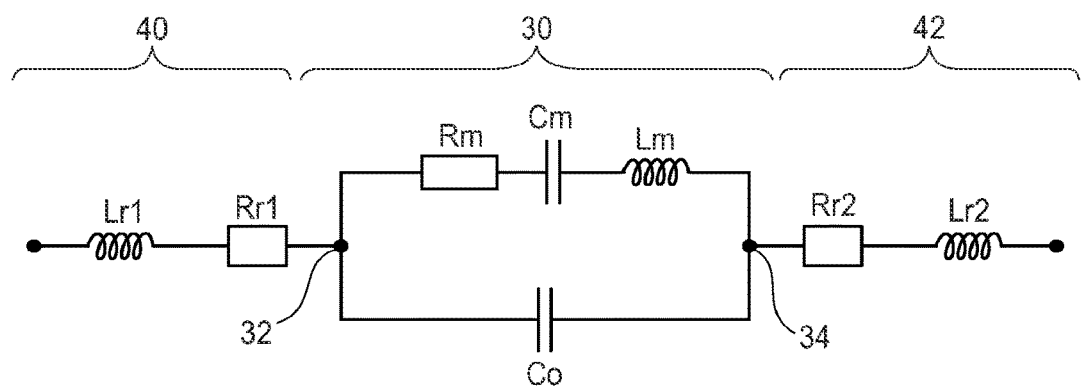
FIG. 2 is an equivalent circuit diagram of a piezoelectric resonator used in the converter of FIG. 1.

FIG. 2 shows the equivalent circuit diagram of the resonator 30 and of the connections 40 and 42.

The equivalent circuit diagram of the resonator 30 comprises a first and a second branch that are connected in parallel between the electrodes 32 and 34. The first branch comprises, in succession, a resistor Rm, a capacitor Cm and an inductor Lm that are connected directly to one another in series between the electrodes 32 and 34. The second branch comprises a capacitor $C_0$ connected directly, on one side, to the electrode 32 and, on the opposite side, to the electrode 34.

The resonator 30 here has a coupling factor k greater than 0.3 or 0.5 and, generally, less than 0.9 or 0.95. The coupling factor k is defined by the following relationship: $k=(Cm/C_0)^{0.5}$.

This diagram also shows the stray inductances and resistances introduced by the wired connections 40 and 42. Here, the stray inductances of the connections 40 and 42 are respectively denoted Lr1 and Lr2, and the stray resistances of the connections 40 and 42 are respectively denoted Rr1 and Rr2.

The dimensioning of the various components of the inverter 2 will now be described for the following experimental conditions:
the frequency $f_s$ is equal to 1.4 MHz,
the ratio $\alpha$ (duty cycle) is equal to 0.3,
the resonator is a piezoelectric resonator marketed under the reference Z0.75T25D-W (C-213) by Fuji Ceramics Corporation®,
the connections 40 and 42 are identical and the stray inductances Lr1 and Lr2 are both equal to 40 nH and the stray resistances Rr1 and Rr2 are both equal to 200µΩ,
the switch I is a MOSFET having a negligible stray capacitance, denoted $C_{oss}$, between its terminals 22 and 24 and a resistance $R_{on}$ equal to 0.015 Ω,
the load Rc is equal to 27Ω,
the DC voltage $V_{in}$ is equal to 20 Vdc, and
the electric power $P_{out}$ delivered to the load Rc is equal to 12 W.

In the specific case of the resonator 30 used to construct this example of an inverter 2, the material 36 is a C213 ceramic marketed by Fuji Ceramics Corporation®. It takes the form of a disk with a diameter of 25 mm and a thickness of 0.75 mm. The series resonant frequency $f_{RP}$ is equal to 2.8 MHz and the parallel resonant frequency $f_a$ is equal to 3.12 MHz. In addition, it was determined that the impedance $Z(f_{RP})$ of the resonator 30 at the frequency $f_{RP}$ is 306.2 mΩ and that its impedance $Z(f_a)$ is equal to 290.60Ω. From this information, it was calculated that the resistance of the resistor Rm, the capacitances of the capacitors Cm and $C_0$ and the inductance of the inductor Lm of the resonator 30 are equal, respectively, to 0.225 Ω, 2.02 nF, 8.6 nF and 1.55 nH. The coupling factor k of the resonator 30 is therefore equal to 0.48.

The various components of the inverter 2 are dimensioned such that the switch I switches at the voltage zero cross. Switching at the voltage zero cross is better known by the acronym ZVS ("zero voltage switching"). It is considered here that the switch I performs zero voltage switching if the voltage between its terminals 22 and 24 at the time when it switches is less than $V_{in}/5$ and preferably less than 2 V.

The dimensioning process for the various components of the inverter 2 is inspired here by the one implemented in order to dimension the various components of a class $\phi_2$ inverter. The dimensioning process for a class $\phi_2$ inverter is described for example in the following article: Rivas Juan M et Al: "A high-Frequency Resonant Inverter Topology With Low-Voltage Stress", IEEE Trans. Power Electron. 23, no. 4, 1759-1771, 2008.

To this end, experiments and digital simulations are performed until finding the suitable values of the components that make it possible to achieve zero voltage switching of the switch I. More specifically, the following steps are reiterated until achieving satisfactory values for the various components of the inverter 2:
step 1): values for the various components of the inverter 2 are chosen, and then,
step 2): the inverter, dimensioned with the values chosen in step 1), is simulated in order to verify that the switch I actually performs zero voltage switching. If so, the dimensioning of the various components is ended. If not, the process returns to step 1) and one or more values of the components are modified.

Step 1) is performed taking into account the following empirical know-how:
the value of the inductor Lf is chosen between 0.3 $Lf_{ini}$ and 3 $Lf_{ini}$ and preferably between 0.5 $Lf_{ini}$ and 2 $Lf_{ini}$, where the inductance $Lf_{ini}$ is defined by the following relationship (1): $Lf_{ini}=1/(9\pi^2 f_s C_0)$.

Next, the value of the inductor Ls is chosen between 0.3 $Ls_{ini}$ and 3 $Ls_{ini}$ and preferably between 0.5 $Ls_{ini}$ and 2 $Ls_{ini}$, where $Ls_{ini}$ is defined by the following relationship (2): $Ls_{ini}=X_s/(2\pi f_s)$, and
the reactance $X_s$ is equal to $Rc(((4V_{in})/(\pi\sqrt{2}))^2/(P_{out} Rc)-1)^{0.5}$.

The capacitance of the capacitor Cs is chosen between 0.3 $Cs_{ini}$ and 3 $Cs_{ini}$ and preferably between 0.5 $Cs_{ini}$ and 2 $C_{ini}$, where $Cs_{ini}$ is defined by the following relationship (3): $Cs_{ini}=1/(2\pi f_s Rc)$.

The capacitance of the capacitor Cp is initially taken to be equal to zero, and then gradually increased with each new iteration of step 1). The capacitance of the capacitor Cp is however generally lower than the capacitance of the capacitor $C_0$ of the resonator 30.

For example, for the first execution of step 1) of the dimensioning process, the inductors Lf, Ls and the capacitances of capacitors Cs and Cp are chosen to be equal, respectively, to $Lf_{ini}$, $Ls_{ini}$, $Cs_{ini}$ and 0.

With this dimensioning process for the components of the inverter 2 and for the experimental conditions specified above, the following values were respectively established for the inductors Lf, Ls and the capacitances of the capacitors Cs and Cp: 800 nH, 1.4 µH, 9.4 nF and 1220 pF.

At this juncture, it is emphasized that the same values obtained for the various components of the inverter 2 when it is used as an inverter are also suitable for operation of the inverter 2 as a rectifier. In addition, the circuit 28 for driving the switch I may be kept unchanged.

In order to be able to compare the efficiency of the inverter 2 with that of a known class $\phi_2$ inverter, in parallel, a class $\phi_2$ inverter was dimensioned for the same experimental conditions and then manufactured. Next, the efficiency of the manufactured inverter 2 was compared with that of the manufactured class $\phi_2$ inverter.

Figure 3:
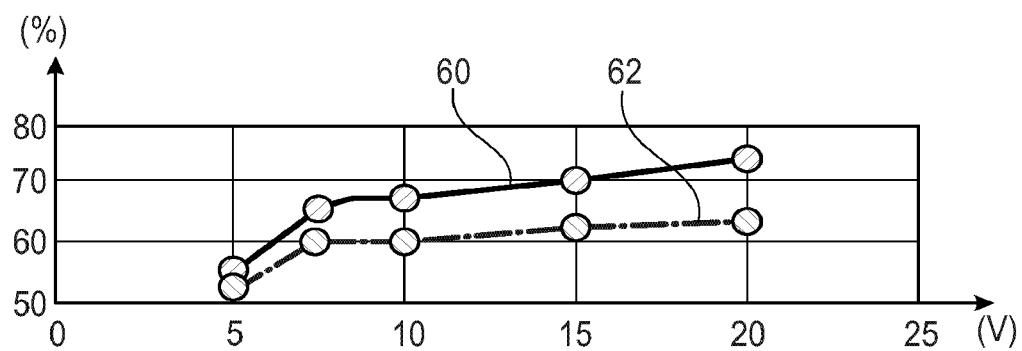
FIGS. 3 and 4 are graphs illustrating the efficiencies of the converter of FIG. 1.

The graph in FIG. 3 shows the evolution of the efficiency of the inverter 2 as a function of the DC voltage $V_{in}$. The curve 60 shows the evolution of the efficiency of the inverter 2, while the curve 62 shows the evolution of the efficiency of the class $\phi_2$ inverter.

Figure 4:
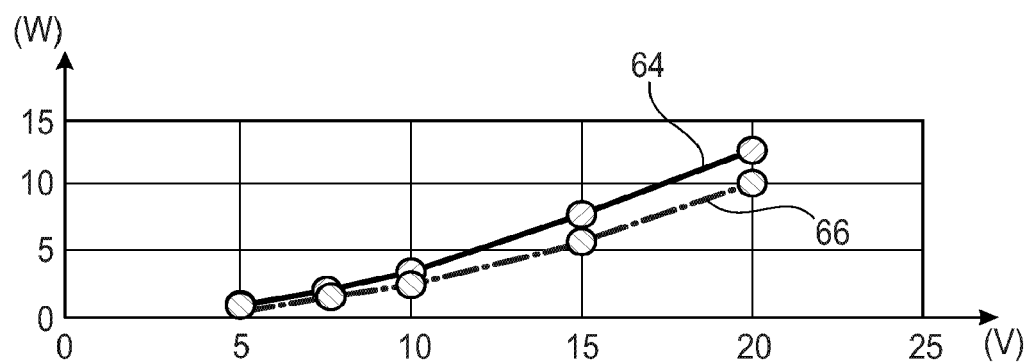

The graph in FIG. 4 shows the evolution of the power $P_{out}$ as a function of the DC voltage $V_{in}$. On this graph, the curves 64 and 66 show the evolution of the power $P_{out}$, respectively, of the inverter 2 and of the class $\phi_2$ inverter.

These graphs show that using the resonator 30 improves the efficiency of the inverter 2 in comparison with the efficiency of a class $\phi_2$ inverter. In addition, it was also verified that the presence of the resonator 30 reduces the voltage constraint across the terminals of the switch I. For example, the highest voltage between the terminals 22 and 24 of the switch I here is less than $2V_{in}$, and often less than $1.7V_{in}$ or $1.5V_{in}$.

Figure 5:
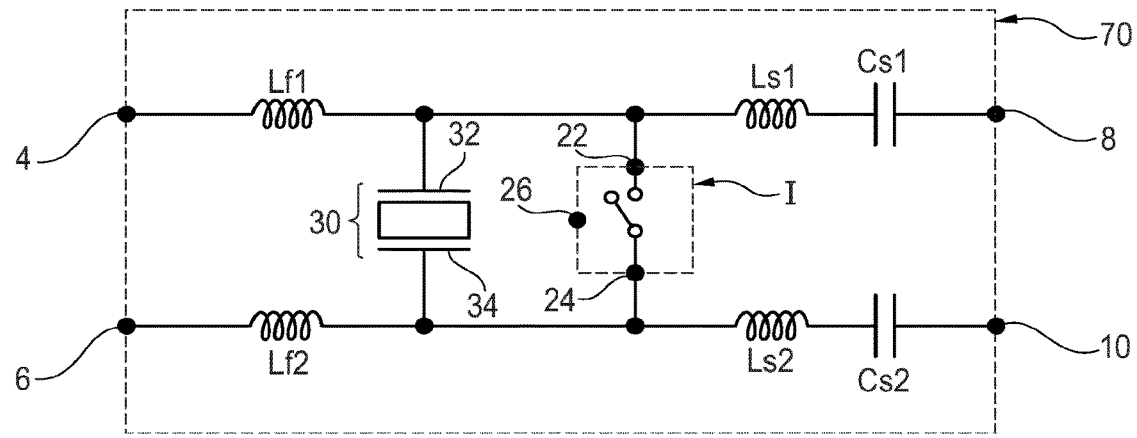
FIGS. 5 and 6 are alternative electronic diagrams of the electrical converter of FIG. 1.

FIG. 5 shows a reversible inverter 70 identical to the inverter 2, except that they incorporate three possible variants of this inverter 2. In this figure and the following figures, to simplify the illustrations, the drive circuit 28, the source 16 and the load Rc are not shown.

The first variant consists in replacing an inductor Lf with two inductors Lf1 and Lf2. The inductor Lf1 is connected directly between the port 4 and the terminal 22 of the switch I. The inductor Lf2 is connected directly between the terminal 24 and the port 6. Typically, the sum of the values of the inductors Lf1 and Lf2 is equal to the value of the inductor Lf. In fact, it is possible to distribute the value of the inductor Lf as desired between the values of the inductors Lf1 and Lf2.

The second variant consists in replacing the series LC circuit formed by the inductor Ls and the capacitor Cs with a first and a second series LC circuit. The first series LC circuit is formed by an inductor Ls1 and a capacitor Cs1 that are connected directly in series between the port 8 and the terminal 22. The second series LC circuit is formed by an inductor Ls2 and a capacitor Cs2 that are connected directly in series between the port 10 and the terminal 24 of the switch I. Just as for the first variant, the sum of the values of the inductors Ls1 and Ls2 is taken to be equal to the value of the inductor Lf. Likewise, the capacitances of the capacitors Cs1 and Cs2 satisfy the following relationship: $1/Cs1+1/Cs2=1/Cs$. From the time when these two equalities are satisfied, it is possible to distribute the value of the inductor Lf and of the capacitance of the capacitor Cs as desired between the values of the inductors Lf1 and Lf2 and the capacitances of the capacitors Cs1 and Cs2.

The third variant consists in omitting the capacitor Cp. To this end, the values of the inductor Ls and of the capacitor Cs are dimensioned so as to achieve zero voltage switching with a capacitor Cp whose capacitance is zero.

Although described in a specific case in which these three variants are combined in one and the same embodiment, these three variants may also be implemented independently of one another.

Figure 6:
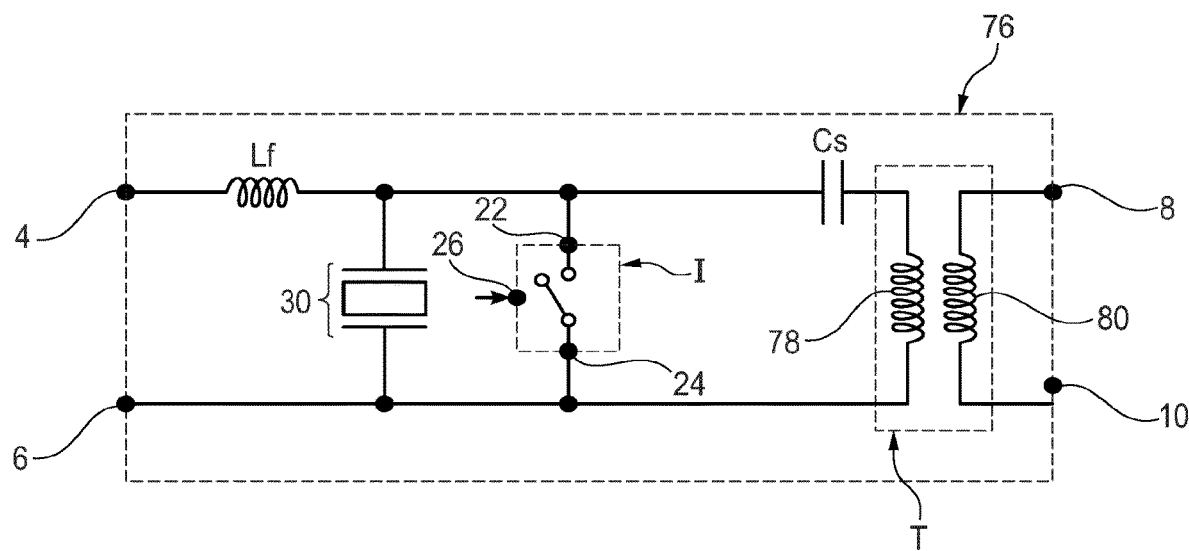

FIG. 6 shows a reversible inverter 76 identical to the inverter 2, except that the inductor Ls is formed using a transformer T. The transformer T comprises a primary winding 78 and a secondary winding 80 that are magnetically coupled to one another. The winding 78 is connected directly in series with the capacitor Cs between the power terminals 22 and 24 of the switch I. The winding 80 is connected directly between the output ports 8 and 10.

Thus, in this embodiment, the ports 8 and 10 are isolated, through galvanic isolation, from the switch I and from the resonator 30.

In this embodiment, the value of the inductor of the transformer T returned to the primary is dimensioned in a manner similar to what has been described for the inductor Ls, such that it replaces this inductor Ls. Thus, the inductor Ls as described with reference to FIG. 1 is replaced with the transformer T in this embodiment.

Figure 7:
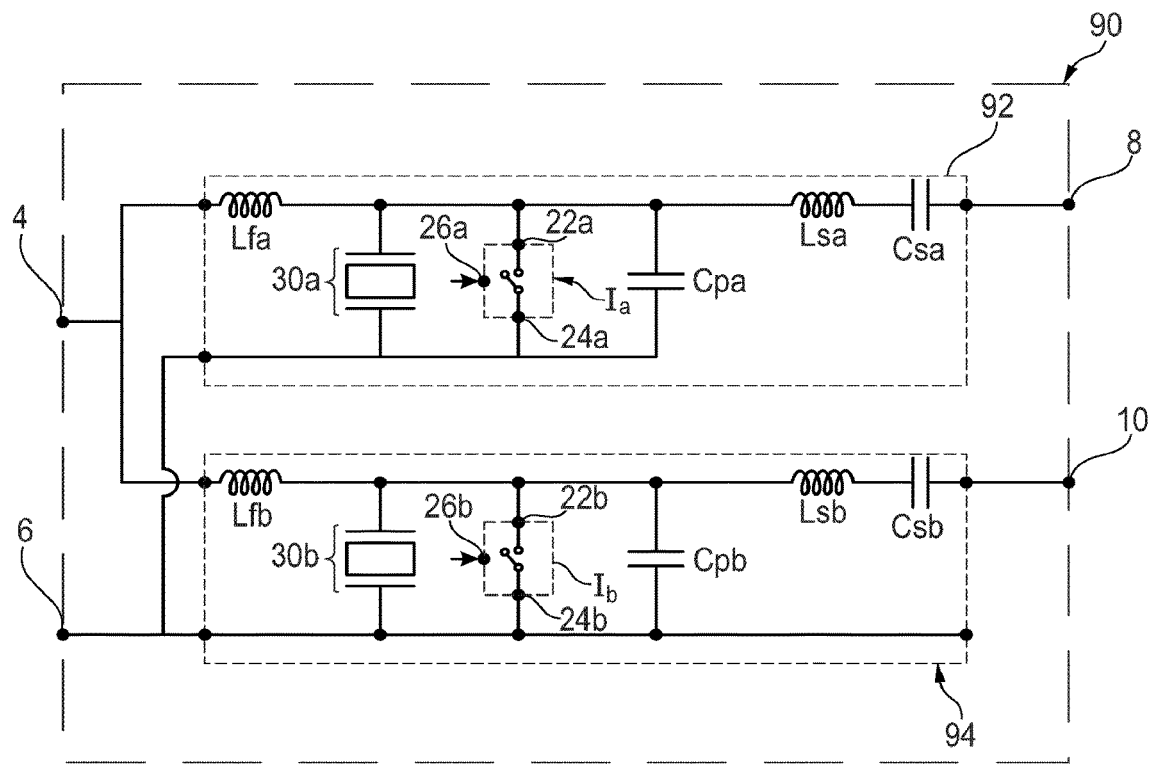
FIG. 7 is an electronic diagram of another embodiment of an electrical converter.

What has been described up until now, in the case where the reversible inverter comprises a single controllable switch, also applies to the case of reversible inverters comprising a plurality of controllable switches. For example, this applies to the assembly known by the name "push-pull". For example, FIG. 7 shows a reversible "push-pull" assembly inverter 90. Schematically, this "push-pull" assembly consists in using two inverters 2 and in connecting their output in differential mode. Thus, here, the inverter 90 comprises an upper part 92 and a lower part 94 that are connected between the input ports 4 and 6 and the output ports 8 and 10.

The upper part 92 is structurally identical here to the inverter 2. The same references are thus used to denote the same components, except that the letter "a" is added to this reference.

The lower part 94 is structurally identical to the upper part 92. The same references are thus used to denote the same components, except that the letter "a" is replaced with the letter "b". Typically, the values of the inductors and of the capacitances of the capacitors in the lower part 94 are taken to be equal to the values of the corresponding inductors and of the capacitances of the corresponding capacitors in the upper part 92. By contrast, the switches $I_a$ and $I_b$ are not controlled in the same way. For example, they are controlled so as to switch in phase opposition.

The general structure and the operating principle of such a "push-pull" assembly inverter is known. For example, this is described in the following articles:

Article A3: John S. Glaser et al: "*A 500 W Push-Pull Dc-Dc Power Converter with a 30 MHz Switching Frequency*", 978-1-4244-4783-1, IEEE, 2010, and Article A5: Lei Gu et Al: "*High-Frequency Resonant Converter with Synchronous Rectification for High Conversion Ratio and Variable Load Operation*", The 2018 International Power Electronics Conference, IEEE, 2018.

With regard to the dimensioning of the components of the inverter 90, this is performed as described in articles A3 and A5, except that the possible ranges of values described with reference to FIG. 1 are used for the inductors Lfa, Lsa and the capacitance of the capacitor Csa to establish the initial values and limit the possible values of the various components of the inverter 90.

Figure 8:
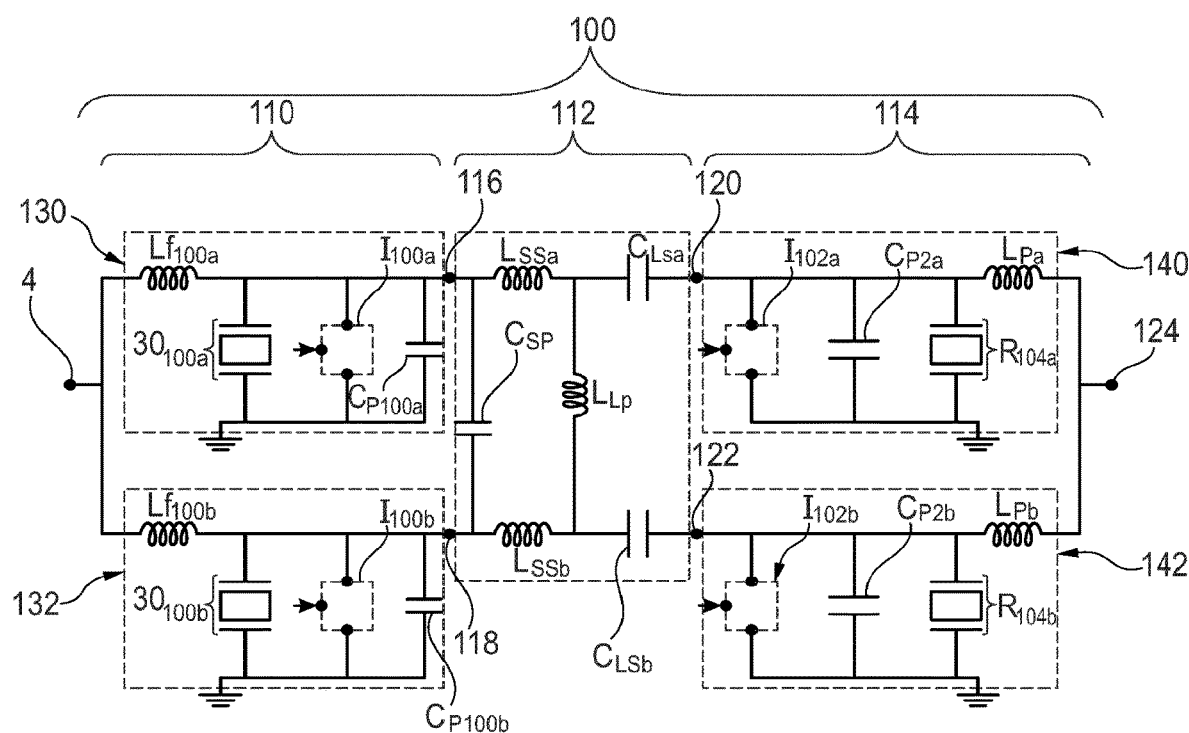
FIG. 8 is an electronic diagram of a DC-DC converter.

FIG. 8 shows another example in which it is beneficial to connect a piezoelectric resonator between the power terminals of a controllable switch of an inverter. More precisely, FIG. 8 shows a DC-DC converter 100. The converter 100 comprises:

a section 110 for converting a DC voltage $V_{in}$ received on an input port 4 into an AC voltage delivered between output ports 116 and 118, an impedance matching section 112 connected between the ports 116 and 118 and that delivers the filtered sinusoidal voltage on output ports 120 and 122, and a section 114 for converting the AC voltage delivered between the ports 120 and 122 into a DC voltage $Vdc_{out}$ delivered on an output port 124.

In this embodiment, the voltage $V_{in}$ is equal to the potential difference between the port 4 and ground. The voltage $Vdc_{out}$ is equal to the potential difference between the port 124 and the ground of the converter 100.

Section 110 comprises two inverters 130 and 132 mounted in a "push-pull" assembly, as already described with reference to FIG. 7. Each of the inverters 130, 132 is structurally identical to the inverter 2, except that the inductor Ls and the capacitor Cs are integrated into the inductors and the capacitors of section 112. Under these conditions, components of the inverters 130 and 132 that are structurally identical to those of the inverter 2 bear the same references, but followed by the index "100a" for the inverter 130 and the index "100b" for the inverter 132.

The matching section 112 is structurally identical to that described in article A5. It is therefore not described in more detail here.

Section 114 comprises two rectifiers 140 and 142 mounted in a "push-pull" assembly, as described in article A5. The two rectifiers 140 and 142 are structurally identical to one another. Under these conditions, components of the rectifier 142 that are identical to those of the rectifier 140 bear the same reference, but followed by the index "b" instead of the index "a".

The rectifier 140 is a reversible inverter used to transform the AC voltage between the ports 120 and 122 into a DC voltage delivered between the port 124 and ground. To this end, the structure of the rectifier 140 is identical here to that of the inverter 130. The rectifier 140 thus comprises a controllable switch $I_{102a}$ and a capacitor $C_{P2a}$ that are connected in parallel with one another directly between the port 120 and ground. The switch $I_{102a}$ is for example identical to the switch I from FIG. 1. Moreover, it is controlled in the same way.

The rectifier 140 also comprises a piezoelectric resonator $R_{104a}$ connected directly in parallel between the power terminals of the switch $I_{102a}$. The resonator $R_{104a}$ is identical here to the resonator 30.

Finally, the port 120 is connected directly to the output port 124, passing via an inductor $L_{Pa}$.

The various components of the converter 100 are for example dimensioned as described in article A5, except that the possible ranges of values described with reference to FIG. 1 are used for the corresponding components of the inverters 130 and 132.

Section II: Variants

The inverter 2 is not necessarily produced in the form of a printed circuit onto which the majority of the components of this inverter are soldered. For example, as a variant, the components of the inverter 2 are soldered onto a ceramic also forming the piezoelectric material of the piezoelectric resonator. In another possible embodiment, the various components of the inverter 2 are co-integrated onto one and the same silicon chip. It is also possible to contemplate producing the inverter 2 through 3D printing or any other technology.

As a variant, the capacitor Cs is omitted. In this case, the AC voltage $V_{out}$ oscillates not around 0 Vdc but around a continuous and constant voltage other than 0 Vdc.

In another embodiment, the capacitor Cs is connected directly on one side to the port 10 and, on the opposite side, to the terminal 24 of the switch I. In this case, the inductor Ls is connected directly on one side to the port 8 and, on the opposite side, to the terminal 22 of the switch I.

The order in which the inductor Ls and the capacitor Cs are connected to one another may be swapped.

As a variant, the inductor Lf is connected between the port 6 and the terminal 24 of the switch I. In this case, the terminal 22 of the switch I is connected directly to the port 4.

Many other embodiments of the switch I are possible. For example, the switch I may be an IGBT ("insulated-gate bipolar transistor") transistor, a bipolar transistor, a thyristor or any other type of switch capable of switching at the frequency $f_s$.

The electrodes 32 and 34 may be connected directly to the terminals 22 and 24 of the switch I through any conceivable solution, such as for example electrical tracks of the printed circuit board. In fact, what is important is that the resonator 30 is connected in parallel with the switch I between the terminals 22 and 24.

What has been described applies to all frequencies $f_s$ and even for frequencies $f_s$ less than 1 MHz or less than 500 kHz. However, as indicated, the frequency $f_s$ is preferably greater than 1 MHz because this improves the power density and the response time of the inverter. For example, the frequency $f_s$ is between 1 MHz and 300 MHz or between 1 MHz and 200 MHz or between 1 MHz and 100 MHz, or only in the very high frequency range between 30 MHz and 300 MHz. The frequency $f_s$ may also be only in the high frequency range, that is to say between 1 MHz and 30 MHz.

The values of the resistor Rm, of the capacitances of the capacitors Cm and $C_0$ and of the inductor Lm of the piezoelectric resonator were determined here from measurements performed on a commercially available piezoelectric resonator. As a variant, the values of the resistor Rm, of the capacitances of the capacitors Cm and $C_0$ and of the inductor Lm are first of all set, and then the corresponding piezoelectric resonator is then constructed with these electrical characteristics. To this end, it is possible to adjust the various dimensions of the piezoelectric material 36 in order to obtain the desired electrical characteristics. However, when setting the values of the resistor Rm, of the capacitances of the capacitors Cm and $C_0$ and of the inductor Lm, it is necessary to take into consideration certain constraints in order for it to be possible to produce the corresponding piezoelectric resonator. For example, the coupling factor k should be less than one and, generally, less than 0.9 or 0.95. Likewise, the possible choices for the resistor Rm, for the capacitor Cm and for the inductor Lm are limited. Thus, even in this case, it is necessary to adapt the values of the other components of the inverter so that it is possible to construct the piezoelectric resonator that has the required electrical characteristics.

What has been described here applies to the case in which the inverter is not reversible. Thus, everything that has been described here applies to the case in which the electrical converter is a non-reversible inverter or a non-reversible rectifier.

Section III: Advantages of the Described Embodiments

The converters described here operate at frequencies $f_s$ greater than 1 MHz. Therefore, the values of the inductors and of the capacitors are far smaller than if the frequency $f_s$ were lower. The dimensions of the inductors and of the capacitors are therefore small, thereby reducing the footprint of the converter. This also results in a much higher power density of the converter. In addition, since the values of the inductors and of the capacitors are small, it is possible to produce these inductors and these capacitors directly through electrical tracks etched onto the printed circuit board. This therefore also simplifies the manufacture of such a converter.

Operating at a frequency $f_s$ greater than 1 MHz also improves the response time of the converter.

The presence of the piezoelectric resonator connected directly between the power terminals of the controllable switch makes it possible to eliminate even-order harmonics in the voltage present between its power terminals. By virtue of this, the voltage stress across the terminals of this switch is reduced. The voltage stress is reduced here to a value less than $2.5V_{in}$ or $2V_{in}$. By way of comparison, the voltage stress in class $\phi_2$ inverters is greater than $2.5V_{in}$. In class E inverters, the voltage stress is greater than $3.5V_{in}$. Due to this reduction in voltage stress, it is possible:

to use a less bulky switch and therefore, with equal efficiency, to reduce the footprint of the converter, and/or to use a switch having a lower resistance $R_{on}$ for one and the same DC voltage and therefore, for an equal footprint, to increase the efficiency of the converter.

The dispersion of the characteristics of a piezoelectric resonator is far lower in comparison with other types of resonator, such as LC resonant circuits. Thus, since the characteristics of the piezoelectric resonator are known with greater accuracy, errors in terms of the dimensioning of the other components of the converter are reduced. This ultimately improves the efficiency of the converter.

The electrical characteristics of a piezoelectric resonator are less sensitive to temperature variations than other types of resonator, such as an LC resonant circuit. The temperature range within which the converter is able to operate with an efficiency greater than a predetermined threshold is thus greater when a piezoelectric resonator is used than if another type of resonator were used.

The fact that the quality factor of the piezoelectric resonator is greater than fifty makes it possible to achieve a good efficiency, and when this quality factor is greater than one hundred, a very good efficiency is achieved. It will be noted in this regard that the quality factor of a piezoelectric resonator is easily greater than three hundred, whereas an LC resonator generally has a quality factor much lower than fifty.

The fact that the converter comprises only a single controllable switch simplifies the architecture of the converter and reduces the footprint thereof.

Dimensioning the various components of the converter such that the controllable switch performs zero voltage switching greatly reduces energy losses of the converter in the form of heat. This therefore contributes to greatly increasing the efficiency of the converter.

The invention claimed is:

1. An electrical converter chosen from the group consisting of an inverter configured to generate an AC voltage from a DC voltage and a non-reversible rectifier able to generate a DC voltage from an AC voltage, the converter comprising:
    a first and a second DC voltage port via which the DC voltage is received or delivered,
    a first and a second AC voltage port via which the AC voltage is received or delivered,
    a first inductor and a controllable switch that are connected in series between the first and second DC voltage ports, the controllable switch comprising a first and a second power terminal and a control terminal, the controllable switch being connected to the first inductor via the first power terminal, the switch configured, in response to a control signal received on the control terminal, to switch at a frequency greater than 1 MHz, between:
- a closed state in which the first and the second terminals are electrically connected to one another, and
- an open state in which the first and second power terminals are electrically isolated from one another,
- a second inductor configured to pass through a current modulated by the controllable switch, the second inductor and the switch being connected in series between the first and second AC voltage ports, wherein the converter comprises a piezoelectric resonator comprising:
- a first electrode connected directly to the first power terminal of the switch,
- a second electrode connected directly to the second power terminal of the switch, an
- a piezoelectric material interposed between the first and second electrodes.

2. The converter as claimed in claim 1, wherein:
the converter comprises a circuit for driving the switch that connected to the control terminal of the switch, the drive circuit being configured to periodically switch the switch between the open state and the closed state, a switching frequency of the switch is equal to a frequency $f_s$, and
the piezoelectric resonator has a resonant frequency between 1.5 $f_s$ and 2.5 $f_s$.

3. The converter as claimed in claim 2, wherein the frequency $f_s$ is between 10 MHz and 300 MHz.

4. The converter as claimed in claim 1, wherein a quality factor of the piezoelectric resonator is greater than or equal to fifty or one hundred.

5. The converter as claimed in claim 1, wherein various components of the converter are dimensioned such that, each time the switch switches, a voltage between the first and second power terminals is less than 2 V.

6. The converter as claimed in claim 1, wherein the converter comprises a single controllable switch.

7. The converter as claimed in claim 1, wherein the first inductor value is between 0.3 $Lf_{ini}$ and 3 $Lf_{ini}$, where $Lf_{ini}$ is equal to $1/(9\pi^2 f_s C_0)$, where:
- $f_s$ is the switching frequency of the controllable switch, and
- $C_o$ is a series capacitance of the piezoelectric resonator.

8. The converter as claimed in claim 1, wherein a value of the second inductor is between 0.3 $Ls_{ini}$ and 3 $Ls_{ini}$n where $Ls_{ini}$ is equal to $X_s/(2\pi f_s)$ and
- a reactance $X_s$ is equal to $Rc((4 V_{in}/\pi\sqrt{2})^2/(P_{out}Rc)-1)^{0.5}$, where
- $f_s$ is the switching frequency of the controllable switch,
- $V_{in}$ is a DC voltage between the first and second DC voltage ports when the converter is used as the inverter,
- Rc is an electrical resistance of a load connected between the AC voltage ports when the converter is used as the inverter, and
- $P_{out}$ is power delivered to the terminals of the load connected between the AC voltage ports.

9. The converter as claimed in claim 1, wherein the converter comprises a capacitor connected directly in parallel to the first and second power terminals of the switch.

10. The converter as claimed in claim 1, wherein the converter is the inverter.

11. The converter as claimed in claim 2, wherein the frequency fs is between 1 MHz and 300 MHz.

* * * * *